Sept. 8, 1964   R. W. SNYDER   3,148,076
METHOD OF CONSOLIDATING SHEET MATERIAL
Filed March 13, 1958
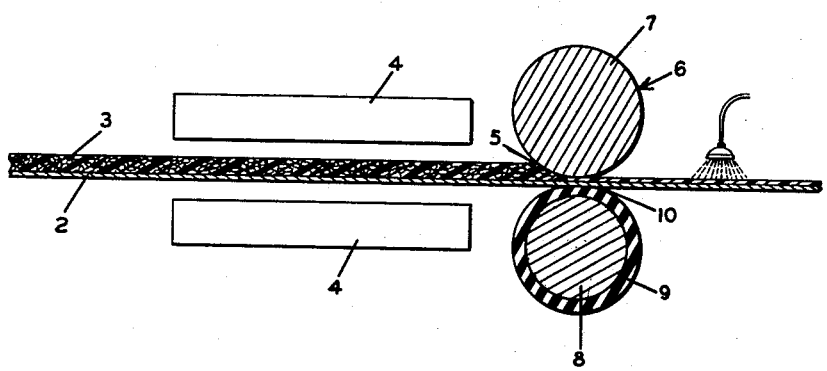
INVENTOR
ROBERT W. SNYDER

United States Patent Office 3,148,076
Patented Sept. 8, 1964

3,148,076
METHOD OF CONSOLIDATING SHEET MATERIAL
Robert W. Snyder, Lititz, Pa., assignor to Armstrong Cork Company, Lancaster, Pa., a corporation of Pennsylvania
Filed Mar. 13, 1958, Ser. No. 721,120
7 Claims. (Cl. 117—21)

This invention is a method of forming a plastic coating on rigid backings and more particularly a method of consolidating a thermoplastic coating from comminuted thermoplastic composition directly on a rigid backing.

Considerable commercial interest has been shown in metal sheets coated with thermoplastic material such as Vinylite and the like. The common method of producing this material is to calender a sheet of the plastic material from comminuted material utilizing conventional calendering techniques and adhesively securing this preformed sheet to a previously prepared metal surface. This operation requires handling the plastic sheet after it has been formed. Sheets so produced must of necessity be rather heavy in order to withstand tearing and wrinkling during handling. These additional processing steps increase the cost of manufacture. Another disadvantage of the laminated product results from the fact that the entire areas of metal is covered by the plastic material, and the desired elements are died from this sheet. With this arrangement all the scrap metal is covered with the plastic composition making the scrap unsuitable for reprocessing unless it is subjected to a preliminary treatment for removal of the plastic composition.

The present invention is directed to a method of consolidating the thermoplastic material directly on precut metal elements from the granulated composition as the metal is passed through the nip of a roll consolidator. Prior to this invention it had never been possible to consolidate granular thermoplastic material directly onto a rigid, nonyielding backing because the extrusion effect resulting from the calendering action would break the bond between the newly formed plastic coating and the metal backing. With this arrangement the scrap is uncoated, and the comminuted thermoplastic material is consolidated only on the precut metal element.

The roll consolidator utilized in carrying out this invention is not the conventional type of calendering equipment used for consolidating sheet material from comminuted material but, on the contrary, is a non-extrusion type consolidator having a resilient backup roll and a metal facing roll. The unique functioning of this device makes it possible to consolidate predeposited comminuted thermoplastic material on the surface of the metal without objectionable extrusion.

An object of this invention is to provide a method of consolidating plastic coatings from comminuted plastic composition directly on a rigid, nonyielding backing.

Another object of this invention is to provide a method of consolidating comminuted plastic composition into sheet form on a roll consolidator without the calender-extrusion effect.

In order to eliminate extrusion it is necessary that the comminuted material to be consolidated on the rigid, nonyielding backing be carefully metered onto the backing to insure a sufficient quantity to form a solid coating of the desired gauge; but at the same time an excess cannot be tolerated because such excess causes extrusion which in turn breaks the bond between the thermoplastic coating and the rigid backing. It is essential, therefore, that an accurately controlled predetermined quantity of comminuted material be placed on the metal backing prior to its passage into the nip of the consolidator. In order to do this a quantity of material approximately three times the thickness of the desired final coating is accurately metered uniformly onto the surface of the metal sheet. The thickness of the metered quantity required, of course, depends on the particle size of the granules which in turn determines the size of the voids disposed throughout the mass. If small granules are used, less than 1/3 consolidation is required; and if granules of a larger size are used, a greater degree of consolidation is required. The 1/3 ratio is based on a particle size ranging from 50-mesh to particles ½" on the flat side and .080" thick.

Before the comminuted material is metered onto the metal backing, it is essential that the metal sheet be properly prepared by removing any foreign matter resulting from its manufacture or storage and is then coated with a suitable adhesive for bonding the comminuted plastic composition onto the metal surface. This coating operation may be carried out by any of the well-known coating means such as a roll coater, doctor blade, sprayer, or other means suitable for the application of a relatively uniform layer of adhesive. Any adhesive suitable for bonding onto the particular metal being used and to the specific thermoplastic formulation being used is suitable for carrying out this operation. For example, if a Vinylite composition is being consolidated on the surface of the metal sheet, any of the conventional vinyl-type adhesives may be used. Typical of the adhesives which can be used is the following formulation:

|  | Percent |
|---|---|
| Vinylite VMCH (8% vinyl chloride, 12% vinyl acetate, and 1% maleic anhydride) | 20 |
| Methyl ethyl ketone | 38 |
| Methyl isobutylene | 18 |
| Toluene | 19 |
| Dioctyl phthalate | 5 |

Other adhesives may be used depending on the specific characteristics of the metal and the thermoplastic composition.

If desired, the invention can be carried out by cutting the metal backing to size prior to the application of the adhesive so that the comminuted material is fed to the adhesively coated metal surface and sticks thereto. This arrangement overcomes the waste of thermoplastic composition because only the quantity necessary to adequately cover the sheet is used. The scrap metal which has been cut before coating is reusable in the conventional manner without the necessity of removing the vinyl coating as is the case with the laminated material of the prior art.

After the comminuted vinyl composition is placed on the surface of the metal sheet by means of the feeder, the composition is heated to its softening point or until a flow condition is noticeable. While in this softened condition it is passed into the nip of the consolidator. In the conventional Vinylite type compositions here under consideration, this softening temperature is usually between 300° and 450° F. The consolidator compacts the heated granules into a sheet of the desired thickness determined by the gauge setting of the consolidator without any effective extrusion. This is possible because of the resilient rubber roll in engagement with the backing or metal sheet which permits slight deflection at the point where it is engaged by the metal backing thereby preventing extrusion or slippage of the thermoplastic material on the metal sheet to which it is being bonded.

Since the one roll of the consolidator is a rubber covered roll, it is essential that the same be operated at a temperature below that at which the rubber would be deleteriously affected. Inasmuch as the Vinylite composition or other plastic composition placed on the backing is at a temperature between 300° F. and 450° F., heat is conducted through the metal backing to the rubber surface of the roll. It is desirable, therefore, to circulate cooling fluid through the rubber covered roll to maintain the surface of the rubber at a temperature below that at which it will be deleteriously affected. The composition of the rubber covering of the roll may vary. Natural rubber has been round satisfactory as well as the synthetic rubbers. It is preferable to use a heat-resistant synthetic rubber which will withstand temperatures in the neighborhood of 350° F.

The rubber covering on the roll must of necessity be of a density which will offer enough resistance to the action of the hard steel roll to exert pressure on the thermoplastic composition to compact and consolidate the same causing a reasonable amount of flow to render the surface continuous. On the other hand if the rubber covering is too hard, then extrusion takes place and the consolidator acts as a calender. This extrusion as explained earlier is objectionable due to the fact that the slippage breaks the bond between the newly formed thermoplastic film and the rigid backing. If the rubber surface on the roll is too soft, then the proper consolidating action does not result and the gauge varies. It is essential, therefore, that great care be exercised in selecting the proper rubber for the covering of the backup roll. It has been found that when consolidating Vinylite composition on rigid backings a backup roll covered with rubber having a Shore durometer hardness of 75 is most suitable. If tougher thermoplastic compositions be used, it may be necessary to increase the hardness of the rubber; and on the contrary, if softer compositions be used, it may be necessary to use a softer rubber in order to attain the desired consolidating effect. The thickness of the rubber covering on the roll is also important because of the insulating effect it has on the action of the temperature control fluid. If the covering is too thin, it will not give the desired cushioning effect; and if it is too thick, the temperature control fluid will not be effective. It has been found that coverings from ¼" in thickness to 1" in thickness are satisfactory.

It is also desirable to circulate temperature control fluid through the facing roll to keep it sufficiently cool to avoid sticking the thermoplastic composition to the metal roll. With Vinylite compositions this should be maintained at about 270° F.

The proper temperature of the comminuted material, the rubber covered backup roll, and the metal facing roll may vary depending on the specific composition being used, but these are all readily determinable by one skilled in the art of producing continuous films from thermoplastic compositions.

Due to the fact that it is virtually impossible to obtain perfect metering onto the surface of the rigid backing and due to the fact that a certain amount of working of the composition is necessary to form a sheet of the desired strength characteristics, it is necessary that provision be made for a certain amount of working or flow of the plastic material during the consolidation step. In order to provide for this, it has been found advantageous to etch or otherwise roughen the surface of the facing roll to form an irregular design similar to a wrinkle finish on the surface of the plastic coating applied to the backing. If a smooth surface on the final product is desired, this can be accomplished by heating the consolidated coating and passing it through a second consolidator. Also in handling unfilled Vinylite thermoplastic compositions a unique smoothing effect can be effected by merely subjecting the rough surface to a temperature sufficient to soften the same, and the flow characteristics will cause the coating to level rendering a surface similar in appearance to sintered metal or ceramic.

The method here under consideration can be utilized in consolidating any thermoplastic material having a softening point within the range handleable on a roll consolidator of the type here under consideration. For best results the softening point of the resin should be in the range between 300° F. and 450° F. An example of a Vinylite composition suitable for consolidation on sheet steel is as follows:

| | Percent |
|---|---|
| Vinylite (vinyl chloride 95%–vinyl acetate 5%) | 70.56 |
| Dioctyl phthalate (plasticizer) | 20.16 |
| Epoxidized soya bean plasticizer (Paraplex G–62) | 4.03 |
| Barium-cadmium soap type stabilizer (Ferro 1825) | 2.82 |
| Pigment | 3.00 |

The thermoplastic composition can be pigmented to any color desired, and different colored granules can be mixed or mottled to form "Spatter" type designs. Then too if geometric designs are desired these can be formed when the loose comminuted material is placed on the rigid backing by means of design laying equipment such as the stencils used in the manufacture of resilient floor and wall coverings. Such designs would be the same for the full depth of the thermoplastic coating; and since extrusion is avoided in the consolidating operation, the previously formed design will not be distorted.

The method here under consideration may be used in forming plastic coatings on metal or other rigid backings, which coatings may be filled or unfilled, depending on the particular requirements for the finished product. When unfilled plastics are used, such, for example, as Vinylite, a very thin film may be obtained giving complete coverage to the metal. If colorings or designs are required, filled pigmented compositions may be used which make possible the production of metal sheets having plastic design surfaces for certain unique decorative effects for panels of automobiles, buildings, furniture, etc. Because of the flexible nature of the thermoplastic film consolidated on the metal, the metal may be bent or drawn in the fabrication of articles of commerce without breaking the film.

The drawing illustrates the method of carrying out this operation. The backing 2 carries the comminuted material 3 to a depth of approximately three times the desired gauge of the finished product. The radiant heaters 4 heat the thermoplastic composition to the softening point prior to its passage into the nip of the roll consolidator 6 which comprises a metal facing roll 7 and a metal backup roll 8 provided with a resilient rubber working surface 9. It is preferable that the heaters 4 be positioned both above and below the metal backing carrying the comminuted material. As the thermoplastic material is consolidated on this device, the pressure exerted on the thermoplastic composition causes the rubber surface 9 to be compressed slightly as shown at 10. This compression of the rubber covering on the backup roll prevents extrusion of the thermoplastic composition on the metal backing.

The invention here under consideration opens a field of considerable commercial importance inasmuch as never before has it been possible to consolidate directly onto a rigid backing by a roll consolidator.

I claim:

1. The method of consolidating a film on a moving backing, the steps comprising applying a coating of adhesive to said backing, depositing a layer of granulated thermoplastic composition to said backing, heating said thermoplastic composition to soften the same, and while maintaining the composition in softened condition passing it through a pressure-applying station to consolidate said granules into a continuous film by applying pressure to the granules while yieldingly supporting the backing to cause said granules to flow into one another.

2. The method of consolidating a film on a moving rigid backing, the steps comprising applying a coating of adhesive to said backing, depositing a layer of granular thermoplastic composition on said adhesive-coated backing, heating said composition to soften the same, and while maintaining the composition in softened condition passing it through a pressure-applying station to consolidate said granules into a continuous film by applying pressure to the granules while yieldingly supporting the backing to cause said granules to flow into one another.

3. The method of consolidating a film on a moving rigid backing, the steps comprising applying a coating of adhesive to said backing, depositing a layer of granular thermoplastic composition to said adhesive-coated backing, heating said composition to soften the same, and while maintaining the composition in softened condition passing it through a pressure-applying station to consolidate the granules into a continuous film by applying pressure to the granules while yieldingly supporting the backing with sufficient firmness to cause said granules to flow into one another.

4. The method of consolidating a film on a moving rigid backing, the steps comprising applying a coating of adhesive to said backing, depositing a layer of granular thermoplastic composition on said adhesive-coated backing, heating said composition to a temperature between 300° F. and 450° F. and while maintaining the composition at this temperature passing it through a pressure-applying station to consolidate said granules into a continuous film by applying pressure to the granules at a temperature of between 225° F. and 275° F. while yieldingly supporting the backing at a temperature of 180° F. to 300° F. to cause said granules to flow into one another.

5. The method of consolidating a film on a moving rigid backing, the steps comprising applying a coating of adhesive to said backing, depositing a layer of granular thermoplastic composition comprising a copolymer of vinyl chloride and vinyl acetate on said adhesive-coated backing, heating said composition to soften the same, and while maintaining the composition in softened condition passing it through a pressure-applying station to consolidate said granules into a continuous film by applying pressure to the granules while yieldingly supporting the backing to cause said granules to flow into one another.

6. The method of consolidating a film on a moving rigid backing, the steps comprising applying a coating of adhesive to said backing, depositing a layer of granular thermoplastic composition on said adhesive-coated backing, said thermoplastic composition comprising a copolymer of 95% vinyl chloride and 5% vinyl acetate, heating said composition to soften the same, and while maintaining the composition in softened condition passing it through a pressure-applying station to consolidate said granules into a continuous film by applying pressure to the granules while yieldingly supporting the backing to cause said granules to flow into one another.

7. The method of consolidating a film on a moving rigid backing, the steps comprising applying a coating of adhesive to said backing, depositing a layer of granular thermoplastic composition on said adhesive-coated backing, heating said composition to soften the same, and while maintaining the composition in softened condition passing it through a pressure-applying station to consolidate said granules into a continuous film by applying pressure to the granules while yieldingly supporting the backing to cause said granules to flow into one another with the amount of commingling at the interface between the film and the pressure-applying means being greater than throughout the balance of the film.

References Cited in the file of this patent

UNITED STATES PATENTS

| | | |
|---|---|---|
| 2,100,712 | Emmey | Nov. 30, 1937 |
| 2,279,774 | Bolton | Apr. 14, 1942 |
| 2,318,272 | Weigle et al. | May 4, 1943 |
| 2,513,434 | Tinsley | July 4, 1950 |
| 2,728,703 | Kiernan et al. | Dec. 27, 1955 |
| 2,759,866 | Seymour | Aug. 21, 1956 |
| 2,888,975 | Benedict | June 2, 1959 |

FOREIGN PATENTS

| | | |
|---|---|---|
| 649,043 | Great Britain | Jan. 17, 1951 |
| 381,448 | France | Jan. 11, 1908 |

UNITED STATES PATENT OFFICE
CERTIFICATE OF CORRECTION

Patent No. 3,148,076 September 8, 1964

Robert W. Snyder

It is hereby certified that error appears in the above numbered patent requiring correction and that the said Letters Patent should read as corrected below.

Column 2, line 31, for "8%" read -- 87% --.

Signed and sealed this 5th day of January 1965.

(SEAL)
Attest:

ERNEST W. SWIDER
Attesting Officer

EDWARD J. BRENNER
Commissioner of Patents